(12) United States Patent
Frassica et al.

(10) Patent No.: US 8,403,676 B2
(45) Date of Patent: Mar. 26, 2013

(54) ANATOMICAL MODEL

(75) Inventors: James J. Frassica, Chelmsford, MA (US); Robert E. Ailinger, Norwood, MA (US); Paul Akerman, Greenwich, RI (US); Bill Bookwalter, Somerville, MA (US)

(73) Assignee: Olympus Endo Technology America Inc., Southborough, MA (US)

( * ) Notice: Subject to any disclaimer, the term of this patent is extended or adjusted under 35 U.S.C. 154(b) by 576 days.

(21) Appl. No.: 12/259,066

(22) Filed: Oct. 27, 2008

(65) Prior Publication Data

US 2009/0226868 A1    Sep. 10, 2009

Related U.S. Application Data

(63) Continuation-in-part of application No. 11/804,873, filed on May 21, 2007, now Pat. No. 7,854,612.

(60) Provisional application No. 60/801,719, filed on May 19, 2006, provisional application No. 61/000,539, filed on Oct. 26, 2007.

(51) Int. Cl.
*G09B 23/28* (2006.01)
(52) U.S. Cl. ..................................................... 434/267
(58) Field of Classification Search .................. 434/262, 434/267, 268, 272, 295–297
See application file for complete search history.

(56) References Cited

U.S. PATENT DOCUMENTS

| | | | |
|---|---|---|---|
| 4,001,952 A * | 1/1977 | Kleppinger .................... 434/262 |
| 4,055,148 A * | 10/1977 | Brockman et al. ............ 119/723 |
| 4,355,631 A * | 10/1982 | LeVahn .......................... 600/230 |
| 5,061,187 A * | 10/1991 | Jerath ............................ 434/262 |
| 5,149,270 A * | 9/1992 | McKeown ..................... 434/262 |
| 5,231,974 A * | 8/1993 | Giglio et al. ................... 600/206 |
| 5,320,537 A | 6/1994 | Watson |
| 5,403,191 A * | 4/1995 | Tuason ........................... 434/262 |
| 5,425,644 A * | 6/1995 | Szinicz .......................... 434/268 |
| 5,947,743 A * | 9/1999 | Hasson .......................... 434/262 |
| 5,947,744 A * | 9/1999 | Izzat ............................. 434/272 |
| 6,052,932 A * | 4/2000 | Reddig et al. .............. 40/611.07 |
| 6,062,866 A | 5/2000 | Prom |
| 6,077,221 A * | 6/2000 | Fowler, Jr. .................... 600/233 |
| D435,062 S * | 12/2000 | Alvarez et al. ................ D18/40 |
| 6,336,812 B1 * | 1/2002 | Cooper et al. ................ 434/267 |
| 6,511,325 B1 | 1/2003 | Lalka et al. |
| 6,543,657 B2 | 4/2003 | Fan et al. |
| 6,773,263 B2 | 8/2004 | Nicholls et al. |
| 6,887,092 B2 * | 5/2005 | Minota ......................... 439/372 |
| 6,908,309 B2 * | 6/2005 | Gil et al. ....................... 434/267 |
| 6,997,719 B2 | 2/2006 | Wellman et al. |
| 7,008,232 B2 | 3/2006 | Brassel |
| 7,059,168 B2 | 6/2006 | Hibi et al. |
| 7,568,247 B2 * | 8/2009 | Strobel et al. .................... 5/613 |
| 8,113,847 B2 * | 2/2012 | Boachie-Adjei ............. 434/274 |
| 2001/0019818 A1 | 9/2001 | Yong |
| 2004/0025253 A1 * | 2/2004 | Heimbrock et al. ............... 5/425 |
| 2005/0074732 A1 | 4/2005 | Morris |
| 2007/0020598 A1 | 1/2007 | Yamashita et al. |
| 2008/0076101 A1 | 3/2008 | Hyde et al. |
| 2008/0187895 A1 | 8/2008 | Sakezles |

* cited by examiner

*Primary Examiner* — Kurt Fernstrom
(74) *Attorney, Agent, or Firm* — Pandiscio & Pandiscio

(57) ABSTRACT

An anatomical model comprising:
a lumen structure;
a frame; and
movable connections selectively supporting the lumen structure to the frame.

19 Claims, 6 Drawing Sheets

ANATOMICAL MODEL

REFERENCE TO PENDING PRIOR PATENT APPLICATIONS

This patent application:

(i) is a continuation-in-part of prior U.S. patent application Ser. No. 11/804,873, filed May 21, 2007 now U.S. Pat. No. 7,854,612 by James J. Frassica et al. for ANATOMICAL MODEL, which in turn claims benefit of prior U.S. Provisional Patent Application Ser. No. 60/801,719, filed May 19, 2006 by James Frassica et al. for ANATOMICAL MODEL PROV); and (ii) claims benefit of prior U.S. Provisional Patent Application Ser. No. 61/000,539, filed Oct. 26, 2007 by James J. Frassica et al. for ANATOMICAL MODEL.

The three above-identified patent applications are hereby incorporated herein by reference.

FIELD OF THE INVENTION

This invention relates to anatomical models in general, and more particularly to anatomical models of a mammalian tract for use in teaching endoscopic insertion techniques and therapeutic procedures to physicians and other medical personnel.

BACKGROUND OF THE INVENTION

In most mammals, mucous membranes line the passages by which internal organs communicate with the exterior environment. By way of example but not limitation, the two primary mammalian tracts (i.e., the gastrointestinal and genitourinary tracts) are lined with mucous membranes. These mucous membranes are generally soft and velvety, and very vascular, and their surfaces are coated over by their mucous secretion, which is typically of a viscous consistency. The mucous serves to protect tissue from foreign substances which may be introduced into the body.

In order to provide a training tool for physicians and other medical personnel who are learning endoscopic insertion techniques and therapeutic procedures, it has been found desirable to provide a clinically realistic anatomical model of the mucous membranes which line the two primary mammalian tracts, i.e., the gastrointestinal and genitourinary tracts.

Many, if not most, of the prior art anatomical models of the gastrointestinal and genitourinary tracts are single-walled tubular models which are positioned on a base plate. These single-walled tubular models generally utilize elastomeric materials such as silicone or a thermoplastic elastomer (TPE) to simulate the pliable, compliant nature of a gastrointestinal and/or genitourinary tract organ, e.g., the bowel, etc.

However, there are many deficiencies associated with these prior art anatomical models.

For example, elastomeric materials tend to have a high coefficient of friction, which is the opposite of the slippery mucous-lined anatomy of the gastrointestinal and genitourinary tracts. Thus, forming the anatomical model out of an elastomer makes it difficult to pass the instrumentation (e.g., an endoscope) through the anatomical model in a realistic manner. One solution to this problem is to add a lubricant to the anatomical model and/or the instrumentation. However, this approach is not completely satisfactory, since the lubricant can dry out, even in a relatively short time period, which can then make it even more difficult to pass instrumentation through the model.

Another significant deficiency of prior art anatomical models is that these models fail to realistically incorporate the external compression (e.g., abdominal pressure from adjacent organs) which acts on the gastrointestinal and/or genitourinary tract. For example, the bowel and the urethra are both tubular organs which typically lay in a flat condition when these organs are not distended. Prior art anatomical models are generally constructed with self-supporting walls which do not simulate the lay-flat anatomy which is being compressed by abdominal pressure from adjacent organs.

In addition to the foregoing, the gastrointestinal and/or genitourinary tracts are typically supported by the adjacent anatomy via movable connections. By way of example but not limitation, the small bowel is typically movably supported by the mesentery. Prior art anatomical models are generally constructed with fixed supports which do not properly simulate the movable connections which can be characteristic of the gastrointestinal and/or genitourinary tracts.

For these reasons, and others, there is presently a need for a more realistic and accurate anatomical model which can be used as a training tool for physicians and other medical personnel to learn endoscopic insertion techniques and therapeutic procedures.

SUMMARY OF THE INVENTION

It is, therefore, an object of the present invention to provide an accurate and realistic anatomical model which can be used by physicians and other medical personnel to learn endoscopic insertion techniques and therapeutic procedures.

This and other objects are addressed by the provision and use of the present invention which, in one form of the invention, generally comprises an anatomical model comprising an inner lumen and an outer lumen, wherein the inner lumen is disposed inside of the outer lumen so as to create a space therebetween, and further wherein a fluid is disposed within the space, interior to the outer lumen and exterior to the inner lumen, whereby the inner lumen can accurately simulate the mucous membrane lining a mammalian tract (e.g., the gastrointestinal or genitourinary tract).

In another form of the present invention, there is provided an anatomical model which generally comprises a lumen structure supported on a frame using movable connections.

In one preferred form of the invention, there is provided an anatomical model comprising:

a lumen structure;

a frame; and movable connections selectively supporting the lumen structure to the frame.

BRIEF DESCRIPTION OF THE DRAWINGS

These and other objects and features of the present invention will be more fully disclosed or rendered obvious by the following detailed description of the present invention, which are to be considered together with the accompanying drawings wherein like numbers refer to like elements and further wherein.

DETAILED DESCRIPTION OF THE PRESENT INVENTION

Anatomical Model Comprising an Inner Lumen and an Outer Lumen, and a Fluid Disposed in the Space Interior to the Outer Lumen and Exterior to the Inner Lumen The present invention generally comprises an anatomical model comprising an inner lumen and an outer lumen, wherein the inner lumen is disposed inside of the outer lumen so as to create a space therebetween, and further wherein a fluid is disposed within the space, interior to the outer lumen and exterior to the inner lumen, whereby the inner lumen can accurately simulate the mucous membrane lining a mammalian tract (e.g., the gastrointestinal or genitourinary tract).

Figure 1:
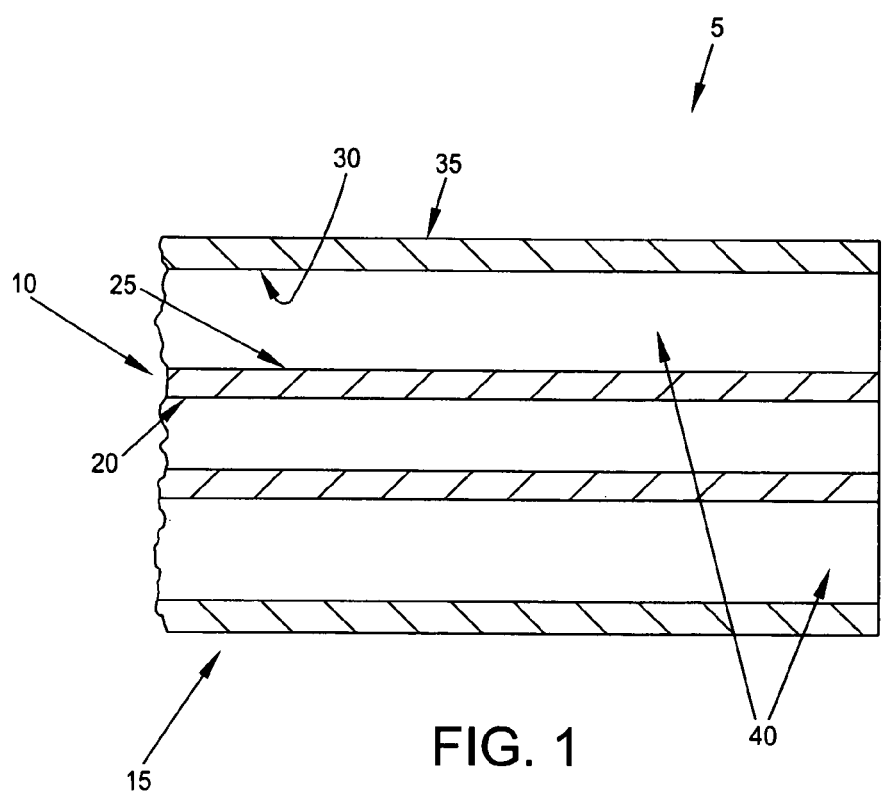
FIG. 1 is a schematic view showing a preferred embodiment of the present invention.

More particularly, and looking now at FIG. 1, there is shown an anatomical model 5 which comprises two lumens, an inner lumen 10 and an outer lumen 15, wherein inner lumen 10 is disposed inside of outer lumen 15. Inner lumen 10 generally comprises an interior surface 20 and an exterior surface 25. Outer lumen 15 generally comprises an interior surface 30 and an exterior surface 35. On account of the foregoing construction, a space 40 is formed in between exterior surface 25 of inner lumen 10 and interior surface 30 of outer lumen 15. Inner and outer lumens 10, 15 are sized so as to approximate different anatomical locations or pathology.

In order to simulate the actual force on a mammalian tract (e.g., the gastrointestinal or genitourinary tract), space 40 is filled with a fluid. This fluid creates a radially compressive force on exterior surface 25 of inner lumen 10 which simulates the forces acting on the mammalian tract within the body (e.g., the gastrointestinal or genitourinary tract within the abdomen). In this respect, it should be noted that inner lumen 10 and outer lumen 15 are sealed so as to prevent fluid communication between the inner and outer lumens.

Inner lumen 10 and outer lumen 15 are formed out of one or more materials which have physical characteristics which, when combined with the effect of a fluid filled space 40, provide properties simulating those of natural tissue. These materials may have inherently low surface friction so as to approximate the coefficient of friction of natural mucosal tissue, or the materials may incorporate a lubricant so as to simulate the low friction of natural mucosal tissue. By way of example but not limitation, the material of inner lumen 10 may comprise polyethylene, and the material of outer lumen 15 may also comprise polyethylene.

In one preferred embodiment of the present invention, inner lumen 10 and/or outer lumen 15 may be constructed from a clear material so as to provide for external visualization.

As noted above, space 40 is filled with a fluid in order to simulate the actual force on a mammalian tract (e.g., the gastrointestinal or genitourinary tract). More particularly, this fluid is selected, and pressurized, so as to provide the desired compressive force on exterior surface 25 of inner lumen 10. By way of example but not limitation, this fluid may be a gas pressurized to a desired level. By way of further example but not limitation, the fluid may be a liquid chosen from a wide range of weights or viscosities so as to affect (i.e., determine) the feel of the simulator. By way of further example but not limitation, where space 40 is filled with a gas, that gas may be nitrogen pressurized to a level of 50 mm Hg, and where space 40 is filled with a liquid, the liquid may be water.

In one preferred embodiment of the present invention, outer lumen 15 may comprise a vessel which holds inner lumen 10.

And in another preferred embodiment of the present invention, mechanical support may be used to create a 2-dimensional or 3-dimensional shape so as to simulate human or animal anatomy.

And in another preferred embodiment of the present invention, inner lumen 10 and outer lumen 15 may comprise "lay-flat" tubing so that anatomical model 5 comprises a long "poly-bag".

In use, the structure shown in FIG. 1 is provided with the fluid positioned in space 40 so as to provide the desired anatomical characteristics for anatomical model 5. Then instrumentation (e.g., an endoscope) is inserted into inner lumen 10. As this occurs, inner and outer lumens 10, 15, with the fluid-filled space 40 therebetween, model the natural tissue in a more realistic manner than the prior art.

In one preferred embodiment, a lubricant may be added to aid in the insertion of the instrumentation into inner lumen 10. By way of example but not limitation, the lubricant may comprise a mixture of water and liquid detergent.

Thus, the present invention provides an anatomical model comprising an inner lumen and an outer lumen, wherein the inner lumen is disposed inside of the outer lumen so as to create a space therebetween, and further wherein a fluid is disposed within the space, interior to the outer lumen and exterior to the inner lumen, whereby the inner lumen can accurately simulate the mucous membrane lining a mammalian tract (e.g., the gastrointestinal or genitourinary tract).

Anatomical Model Comprising a Lumen Structure Supported on a Frame Using Movable Connections In many circumstances, the anatomy of interest may comprise a lumen structure and, furthermore, the lumen structure may be supported on adjacent anatomy via movable connections. By way of example but not limitation, the small bowel comprises a lumen structure which is movably supported by the mesentery along its length. Accordingly, an anatomical model intended to simulate such a small bowel structure should be capable of reproducing not only the lumen passageway of the small bowel, but also the nature and character of the movable connections which attach the lumen passageway to the mesentery.

Other anatomical lumen structures are also movably supported to adjacent structures at various locations along their length.

Figure 2:
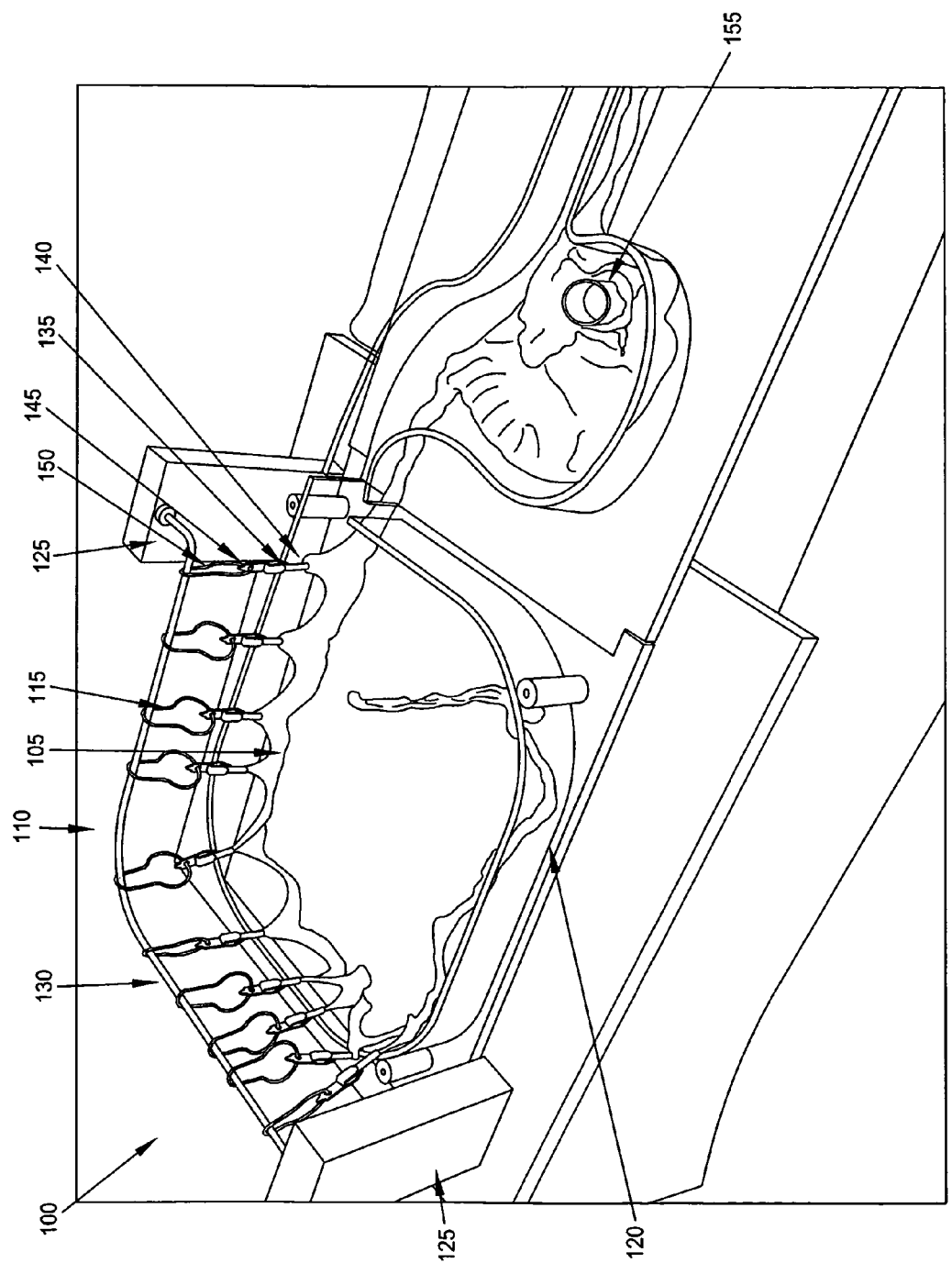
FIG. 2 is a schematic view showing another preferred embodiment of the present invention.
Figure 3:
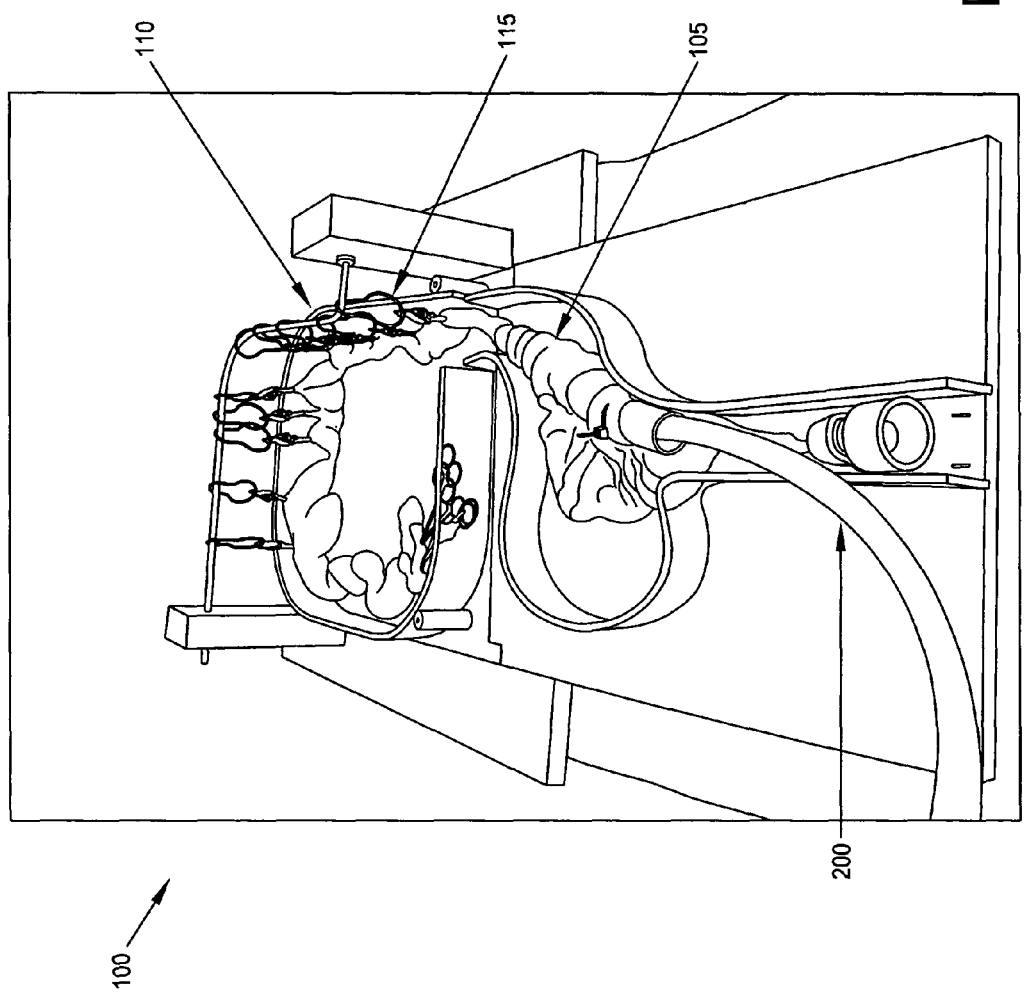
FIGS. 3-6 show an endoscope being advanced through the anatomical model shown in FIG. 2.
Figure 4:
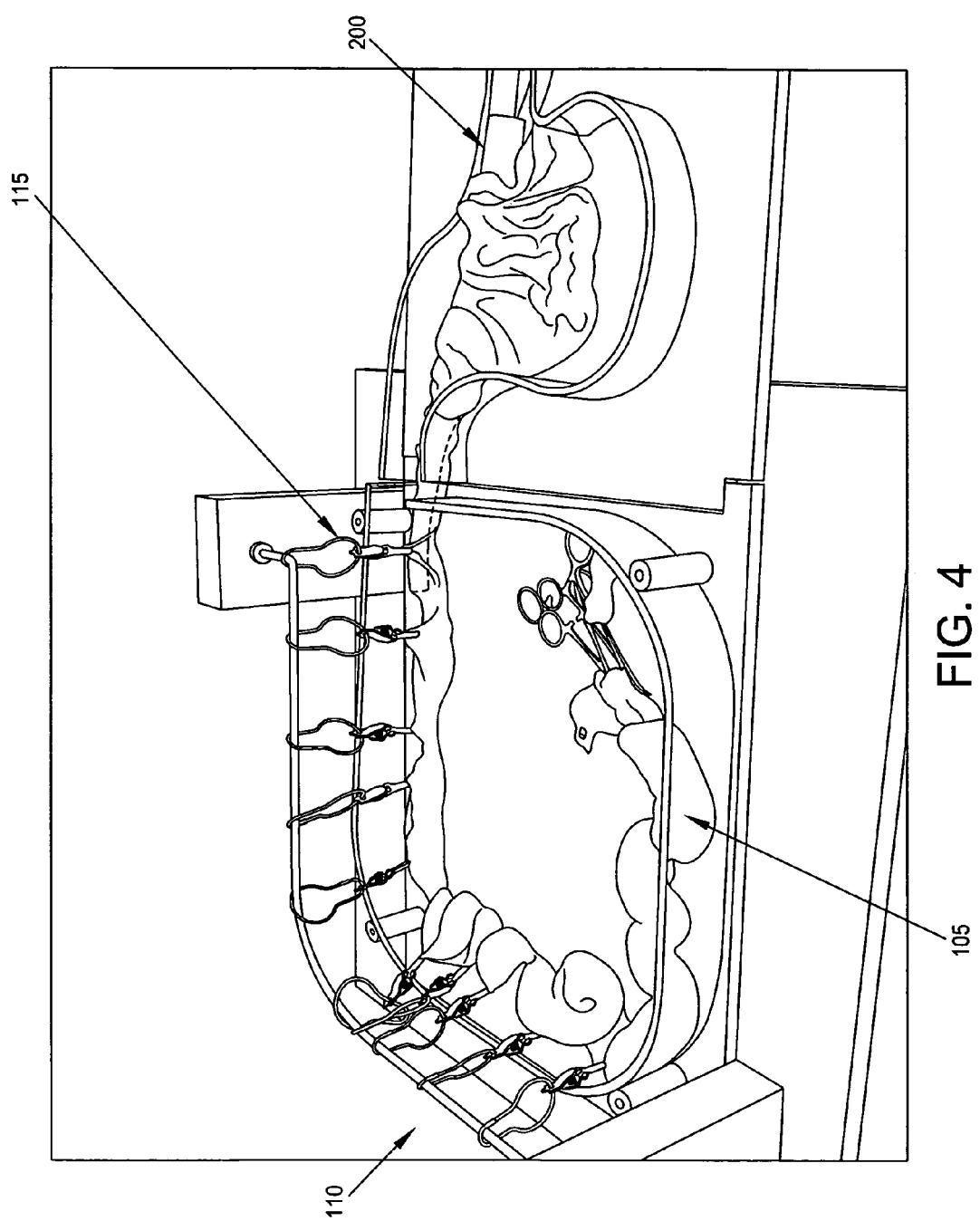
Figure 5:
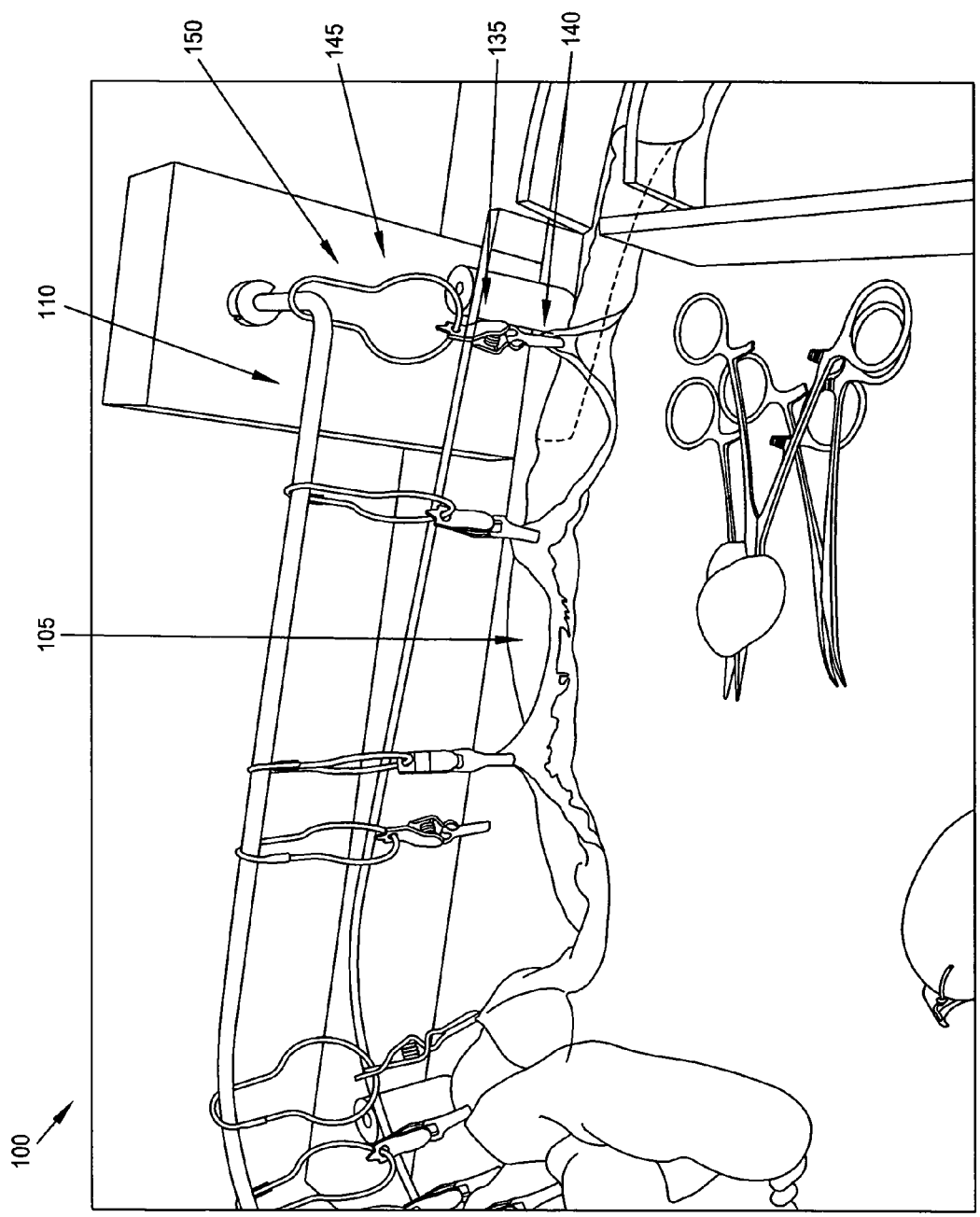
Figure 6:
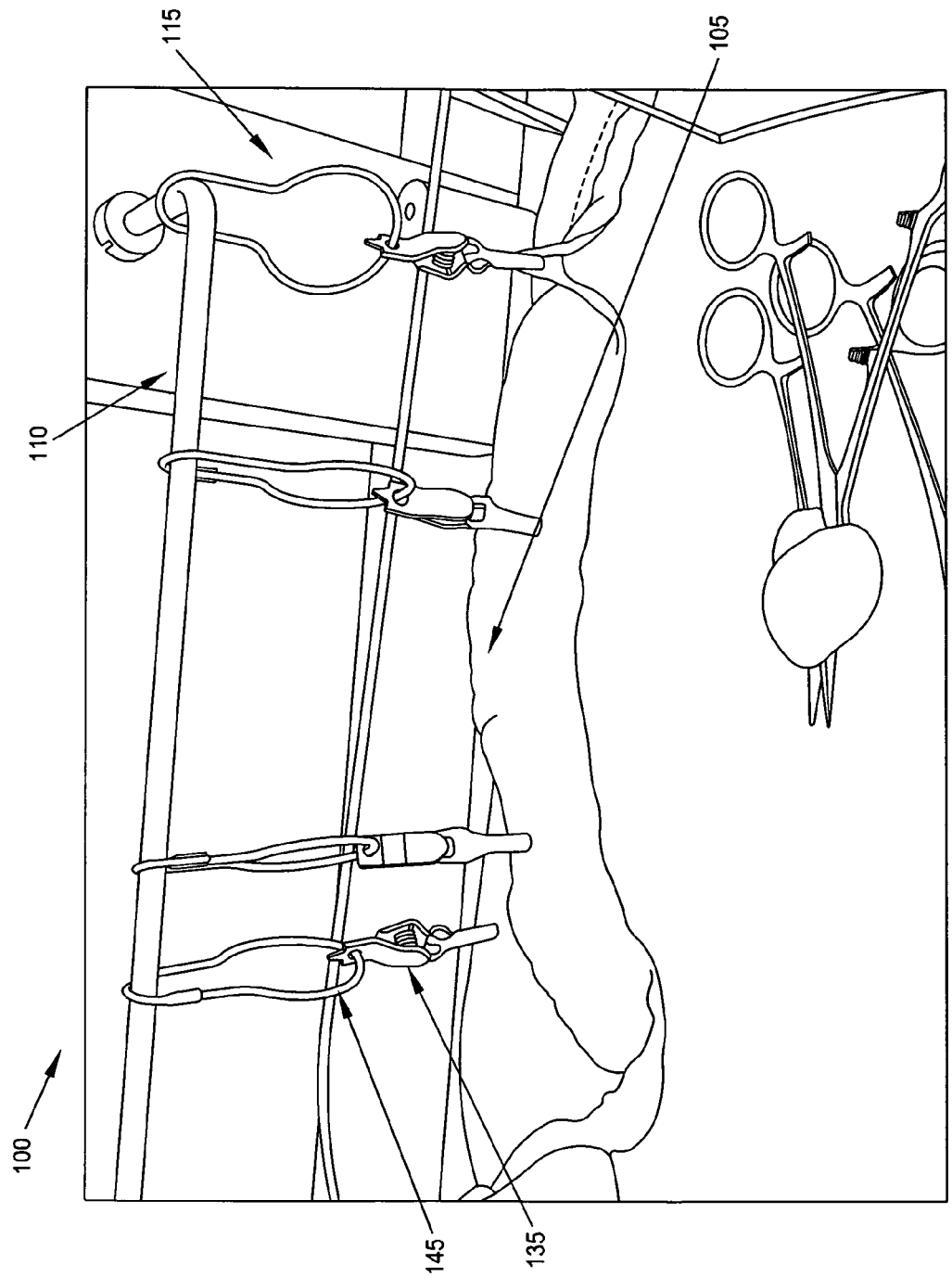

To this end, and looking now at FIG. 2, there is shown an anatomical model 100 which generally comprises a lumen structure 105, a supporting frame 110 and a plurality of movable connections 115 selectively securing lumen structure 105 to supporting frame 110.

Lumen structure 105 preferably comprises an excised specimen of the organ which is to be simulated. By way of example but not limitation, where the anatomical model is to simulate the small bowel, lumen structure 105 preferably comprises an excised small bowel. However, it should also be appreciated that lumen structure 105 need not necessarily comprise an excised organ—thus, lumen structure 105 may also comprise an artificial structure which simulates the organ in geometric form (e.g., shape and size), mechanical structure (e.g., pliability and resiliency), surface characteristics (e.g., texture and coefficient of friction), etc.

Frame 110 preferably comprises an elongated structure capable of supporting a length of lumen structure 105. By way of example but not limitation, frame 110 may comprise a base 120, one or more vertical risers 125 extending upward from base 120, and a rod 130 supported above base 120 by the one or more vertical risers 125. Rod 130 is preferably configured so that it extends in a manner which is generally representative of the disposition of the organ which is to be simulated (e.g., where the small bowel is to be simulated, rod 130 preferably extends along a curving pathway as shown in FIG. 2.

Movable connections 115 serve to selectively secure lumen structure 105 to supporting frame 110. Preferably, movable connections 115 are configured so as to secure lumen structure 105 to supporting frame 110 in a manner which is generally representative of the manner in which the natural organ is secured to its own supporting structure. Thus, for example, and looking now at FIG. 2, where the organ comprises the small bowel which is anatomically connected to the mesentery, movable connections 115 may comprise an organ end 135 comprising an alligator clip 140 for engaging the organ, and a frame end 145 comprising a rod hanger 150 for slidably mounting on rod 130. Alternatively, movable connections 115 may comprise various other clamps, hooks, springs and/or combined elements so as to attach lumen structure 105 to frame 110 in an anatomically realistic manner. Preferably, movable connections 115 are adjustable in location, pathway and function so as to permit accurate simulation of the manner in which the natural organ is secured to its natural supporting structure.

In order to facilitate ease of use, as well as to simulate natural structure, anatomical model 100 may include an entry port 155 so as to provide access to the internal structure of the lumen structure 105.

Furthermore, the lumen structure 105 may be supported within an enclosure which can incorporate appropriate liquids and/or temperature control so as to simulate in vivo conditions.

Additionally, anatomical model 100 may be used with external support elements to create a 2-dimensional path or a 3-dimensional path.

In one preferred form of the invention, anatomical model 100 comprises a lumen structure 105 in the form of a porcine stomach and small bowel, a frame 110 in the form of a rod following a curved pathway, and movable connections 115 in the form of alligator clips 140/rod hangers 150. See FIG. 2. This construction permits the porcine bowel to be pleated during endoscopic examination on the simulated mesentery.

FIGS. 3-6 show an endoscope 200 being advanced through the aforementioned anatomical model.

Thus, the present invention provides an anatomical model which generally comprises a lumen structure supported on a frame using movable connections, in order to simulate both (i) a natural lumen passageway, and (ii) the nature and character of movable connections which attach the lumen passageway to adjacent anatomy.

MODIFICATIONS

While the present invention has been described in terms of certain exemplary preferred embodiments, it will be readily understood and appreciated by those skilled in the art that it is not so limited, and that many additions, deletions and modifications may be made to the preferred embodiments discussed herein without departing from the scope of the invention.

What is claimed is:

1. An anatomical model comprising:
   a lumen structure having a distal end and a proximal end, a longitudinal axis extending between the distal end and the proximal end, and a lumen extending from the distal end to the proximal end, wherein the lumen is configured to receive instrumentation;
   a frame configured to extend along the longitudinal axis of the lumen structure; and
   movable connections selectively supporting the lumen structure along the frame, each of the movable connections comprising a frame end configured to slidably engage the frame.

2. An anatomical model according to claim 1 wherein the lumen structure comprises an excised organ.

3. An anatomical model according to claim 2 wherein the excised organ comprises the small bowel.

4. An anatomical model according to claim 2 wherein the excised organ comprises the stomach.

5. An anatomical model according to claim 1 wherein the lumen structure comprises an artificial structure.

6. An anatomical model according to claim 1 wherein the frame comprises an elongated structure configured to support an elongated length of the lumen structure.

7. An anatomical model according to claim 1 wherein the frame comprises a base, at least one vertical riser extending upwardly from the base, and a rod configured to extend along the longitudinal axis and supported above the base by the at least one vertical riser, wherein the frame ends of the movable connections slidably engage the rod.

8. An anatomical model according to claim 7 wherein the rod is curved along the longitudinal axis.

9. An anatomical model according to claim 7 wherein the frame end comprises a rod hanger.

10. An anatomical model according to claim 7 wherein each of the movable connections comprise at least one selected from the group consisting of a clip, a clamp, a hook and a spring.

11. An anatomical model according to claim 1 wherein the movable connections further comprise an organ end configured to engage the lumen structure.

12. An anatomical model according to claim 11 wherein the organ end comprises an alligator clip.

13. An anatomical model according to claim 1 wherein each of the movable connections comprise at least one selected from the group consisting of a clip, a clamp, a hook and a spring.

14. An anatomical model according to claim 1 wherein the anatomical model further comprises an entry port to the lumen structure.

15. An anatomical model according to claim 1 wherein the anatomical model further comprises an enclosure, and further wherein the lumen structure is contained within the enclosure.

16. An anatomical model according to claim 15 wherein a liquid is disposed within the enclosure.

17. An anatomical model according to claim 15 wherein the enclosure comprises temperature controls for regulating temperature within the enclosure.

18. An anatomical model according to claim 1 wherein the lumen structure reproduces the human gastrointestinal tract.

19. An anatomical model according to claim 1 wherein the lumen structure reproduces the human genitourinary tract.

* * * * *